US010547813B2

(12) United States Patent
Talbot

(10) Patent No.: US 10,547,813 B2
(45) Date of Patent: Jan. 28, 2020

(54) METHOD AND SYSTEM FOR ENABLING AUTOMATED AUDIO KEYWORD MONITORING WITH VIDEO RELAY SERVICE CALLS

(71) Applicant: Chris Talbot, Moorpark, CA (US)

(72) Inventor: Chris Talbot, Moorpark, CA (US)

( * ) Notice: Subject to any disclaimer, the term of this patent is extended or adjusted under 35 U.S.C. 154(b) by 0 days.

(21) Appl. No.: 15/857,804

(22) Filed: Dec. 29, 2017

(65) Prior Publication Data
US 2019/0208166 A1 Jul. 4, 2019

(51) Int. Cl.
H04N 7/15 (2006.01)
H04M 3/42 (2006.01)
H04M 3/22 (2006.01)
G10L 15/22 (2006.01)
H04N 7/14 (2006.01)
G09B 21/00 (2006.01)

(52) U.S. Cl.
CPC ............ H04N 7/15 (2013.01); G09B 21/009 (2013.01); G10L 15/22 (2013.01); H04M 3/2281 (2013.01); H04M 3/42391 (2013.01); H04N 7/147 (2013.01); H04M 2242/12 (2013.01)

(58) Field of Classification Search
USPC .................................................... 379/37–52
See application file for complete search history.

(56) References Cited

U.S. PATENT DOCUMENTS

| 7,349,955 B1 | 3/2008 | Korb et al. |
| 8,010,706 B1 | 8/2011 | Rein et al. |
| 8,528,068 B1 | 9/2013 | Weglein et al. |
| 9,106,789 B1 | 8/2015 | Shipman et al. |
| 9,247,200 B2 | 1/2016 | Gupta et al. |
| 9,330,088 B2 * | 5/2016 | Fitterer ............... G06F 17/2775 |
| 9,558,523 B1 | 1/2017 | Hodge |
| 9,615,060 B1 | 4/2017 | Hodge |
| 9,628,620 B1 | 4/2017 | Rae et al. |
| 9,667,763 B1 * | 5/2017 | Keiser .................... H04M 1/667 |
| 9,794,399 B1 * | 10/2017 | Hodge .................... H04M 3/38 |
| 2005/0086699 A1 * | 4/2005 | Hahn ................ H04M 3/42391 725/106 |
| 2011/0261941 A1 * | 10/2011 | Walters ............... H04M 3/2281 379/188 |
| 2012/0224678 A1 * | 9/2012 | Walters ............... H04M 3/2281 379/189 |

(Continued)

Primary Examiner — Maria El-Zoobi
(74) Attorney, Agent, or Firm — Scheinberg & Associates, PC; John B. Kelly; Michael O. Sheinberg

(57) ABSTRACT

A method and system for video relay service calling with audio monitoring is described. The method includes initiating a video relay service call, the video relay service call including a video portion between a sign language interpreter and a user who is deaf, hard-of-hearing, or speech impaired (D-HOH-SI); an audio portion between the sign language interpreter and a called party; and one or more call parameters. The method further includes determining whether one of the call parameters indicates that the video relay service call should be monitored; in response to determining that the video relay service call should be monitored, directing at least the audio portion of the video relay service call to an audio monitoring service so that the audio portion of the video relay service call between the sign language interpreter and the called party can be monitored by the audio monitoring service.

18 Claims, 3 Drawing Sheets

(56) References Cited

U.S. PATENT DOCUMENTS

2015/0022616 A1 1/2015 Talbot
2017/0280100 A1 9/2017 Hodge
2018/0013886 A1 1/2018 Rae et al.

* cited by examiner

METHOD AND SYSTEM FOR ENABLING AUTOMATED AUDIO KEYWORD MONITORING WITH VIDEO RELAY SERVICE CALLS

TECHNICAL FIELD

The present invention relates to telecommunications services for callers who are deaf, hard-of-hearing, or speech impaired (D-HOH-SI), and in particular to Video Relay Service calls.

BACKGROUND

Traditional telephony presents a problem for persons who are who are D-HOH-SI. Communication by audio telephones requires each party to the call to be able to hear and/or speak to the other party in order to communicate. For hearing or speech impaired persons, audio communication is difficult or impossible, typically precluding the use of audio telephony. The availability of affordable, high-speed packet-switched communications has led to the growth in the use of Video Relay Service (VRS) communication by D-HOH-SI persons. Using VRS equipment, D-HOH-SI persons may place video calls to communicate between themselves and with hearing individuals (non-D-HOH-SI) using sign language (SL). VRS equipment enables D-HOH-SI persons to talk to hearing individuals via a sign language interpreter (SLI), who uses a conventional telephone at the same time to communicate with the party or parties with whom the D-HOH-SI person wants to communicate.

In a corrections environment (e.g., prison, juvenile detention center, etc.), communications between inmates and the outside world present a unique set of issues due to various safety, security, and confidentiality concerns for called parties, inmates, correctional officers and society in general. Audio monitoring technology employing computerized speech recognition can be used to detect keywords spoken by parties in telephone calls between inmates and the outside world that may indicate potential criminal or other prohibited activity. The pre-defined, forbidden, spoken keywords, potentially relating to planned criminal activities, may be detected, resulting in immediate actions such as termination of the call, or alerting of corrections personnel to begin real-time human monitoring of the offending call in anticipation of possible further undesirable discussions.

Because traditional audio-only telephony is adequate for communication between parties who are not D-HOH-SI, existing audio monitoring technology is suitable for communication between non-D-HOH-SI inmates and non-D-HOH-SI called parties. However, inmates classified as deaf, hard-of-hearing, or speech-impaired (D-HOH-SI) communicate with the outside world by way of Video Relay Service (VRS). VRS enables inmates to communicate with an American Sign Language (ASL) interpreter by means of ASL and video telephony. The sign language interpreter (SLI) then speaks to the called party over a standard audio phone via the public switched telephone network (PSTN).

Audio monitoring technology using real-time automated computerized speech recognition monitoring for forbidden keywords is not suitable for use with existing VRS systems because communication between inmates and sign language interpreters is transmitted visually by ASL, and not by audio.

SUMMARY OF THE INVENTION

Embodiments of the present invention are directed to a method for video relay service calling with audio monitoring. The method includes initiating a video relay service call, the video relay service call including a video portion between a sign language interpreter and a user who is deaf, hard-of-hearing, or speech impaired (D-HOH-SI); an audio portion between the sign language interpreter and a called party; and one or more call parameters. The method further includes determining whether at least one of the one or more call parameters indicates that the video relay service call should be monitored; in response to determining that at least one of the one or more call parameters indicates that the video relay service call should be monitored, directing at least the audio portion of the video relay service call to an audio monitoring service so that the audio portion of the video relay service call between the sign language interpreter and the called party can be monitored by the audio monitoring service; and in response to determining that at least one of the one or more call parameters indicates that the video relay service call should not be monitored, connecting the audio portion of the video relay service call between the sign language interpreter and the called party without any audio monitoring.

Other embodiments of the present invention are directed to a system for video relay service calling with audio monitoring. The system includes a video relay service client; a video relay service provider; and an audio monitoring service. The video relay service client initiates a video relay service call, the video relay service call including: a video portion between a sign language interpreter and a user who is deaf, hard-of-hearing, or speech impaired (D-HOH-SI); an audio portion between the sign language interpreter and a called party; and one or more call parameters. The video relay service provider determines whether at least one of the one or more call parameters indicates that the video relay service call should be monitored. In response to determining that at least one of the one or more call parameters indicates that the video relay service call should be monitored, the video relay service provider directs at least the audio portion of the video relay service call to the audio monitoring service so that the audio portion of the video relay service call between the sign language interpreter and the called party can be monitored by the audio monitoring service. In response to determining that at least one of the one or more call parameters indicates that the video relay service call should not be monitored, the video relay service provider connects the audio portion of the video relay service call between the sign language interpreter and the called party without any audio monitoring.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION

Communication between inmates in correctional institutions and the outside world may be an important contributor to the rehabilitation of inmates, potentially reducing recidivism rates and encouraging inmates leaving prison to lead productive, law-abiding lives. Maintaining ties to family and friends (at least law-abiding friends) may be an important component of this communication. In addition, inmates often need to communicate with their attorneys and clergy in confidential legally-protected calls. However, it is also necessary and important to prevent inmates from conveying messages to called parties, and receiving messages from called parties, which may initiate or support criminal activities, either within the correctional institution or the outside world.

Figure 1:
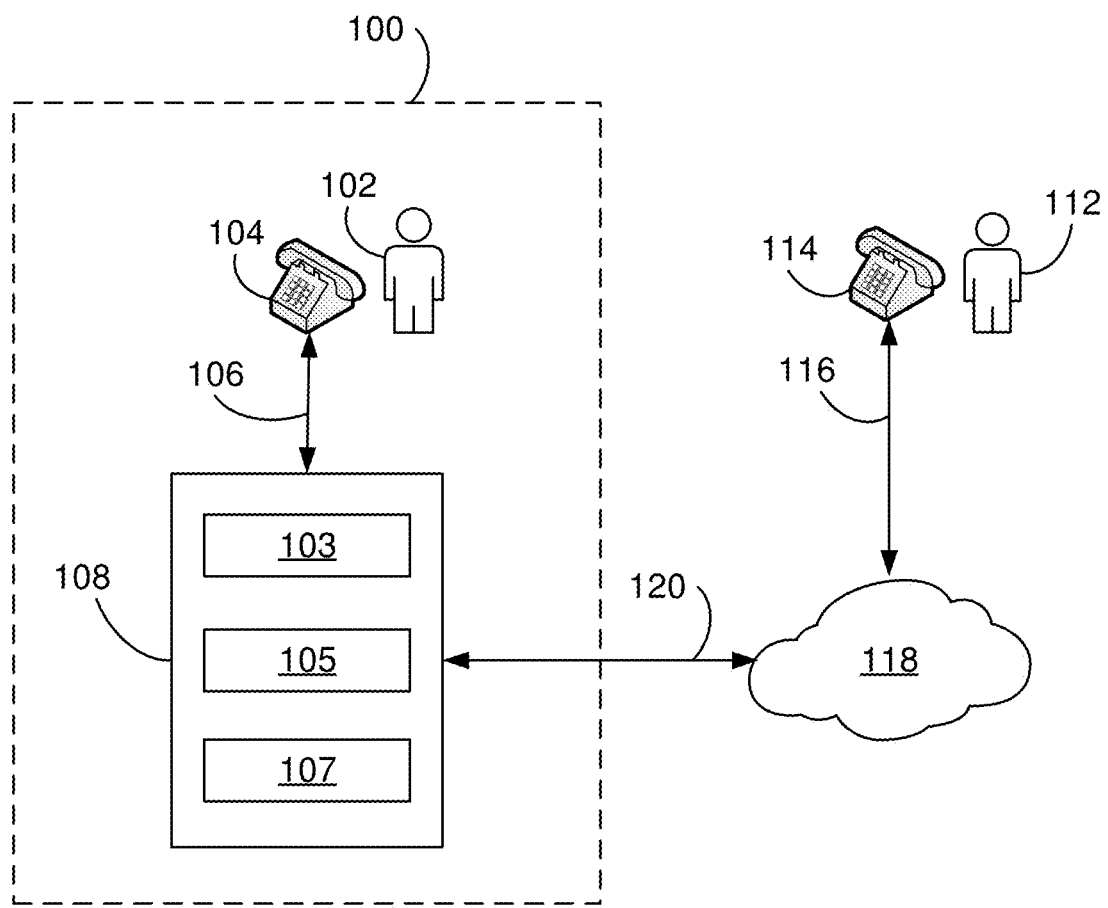
FIG. 1 shows a prior art system with an audio monitoring service as is typically used in corrections facilities.

FIG. 1 shows a prior art system with an audio monitoring service as is typically used in corrections facilities. User 102 is located at corrections facility 100. User 102 can be an inmate, a patient, an employee, a security officer, etc. User 102 places a telephone call to called party 112 using telephone 104. Telephone 104 is connected via connection 106 to audio monitoring service 108. Audio monitoring service 108 is computerized technology for monitoring audio in telephony signals originating from or received by corrections facility 100. Audio monitoring service 108 can be embodied as computer software executing on a computer system adapted to process telephony signals.

Audio monitoring service 108 includes speech recognition component 103 can be used to detect keywords spoken by parties in telephone calls between inmates and the outside world that may indicate potential criminal or other prohibited activity. Audio monitoring service 108 can also include recording component 105 for recording telephony signals originating from or received by corrections facility 100.

Audio monitoring service 108 can also include confidentiality component 107 for automatically determining whether telephony signals originating from or received by corrections facility 100 can be monitored or recorded. For example, telephone calls between an inmate and the inmate's attorney and clergy may be confidential. Monitoring of those calls by corrections facility 100 may be prohibited by law. Telephone calls between inmates and other called parties, such as friends and family, may be subject to monitoring by corrections facility 100.

Some or all of audio monitoring service 108 can be installed at the corrections facility so that any outgoing and incoming telephony signals can be monitored or recorded. FIG. 1 shows audio monitoring service 108 as being located within corrections facility 100 for purposes of illustration. However, some or all of audio monitoring service 108 can be provided outside of the corrections facility by a third-party servicer that specializes in monitoring audio communications.

With any appropriate processing by audio monitoring service 108 enabled, the telephone call between user 102 and called party 112 is connected by connection 120 to public telephone network 118, such as the public switched telephone network (PSTN) and/or voice-over-internet-protocol (VOIP). The telephone call is connected to called party 112 by way of telephone 114 and connection 116 to PSTN 118, as is known in the art. Pre-defined, forbidden, spoken keywords, potentially relating to, for example, planned criminal activities, may be detected by speech recognition component 103 of audio monitoring service 108, resulting in immediate actions such as termination of the call, or alerting of corrections personnel to begin real-time human monitoring of the offending call in anticipation of possible further undesirable discussions.

At present, speech recognition component 103 of audio monitoring service 108 cannot be used with a D-HOH-SI user at a corrections facility who uses video relay service (VRS). A VRS call typically includes two components: (1) a video call between the D-HOH-SI user and a sign language interpreter (SLI), and (2) an audio call between the SLI and the called party. VRS calls with a D-HOH-SI user at a corrections facility do not include audio-based telephony signals that can be monitored by the audio monitoring service of the corrections facility. Instead, video signals are sent and received between the D-HOH-SI user at the corrections facility and the SLI. The SLI is typically an employee of a third-party VRS service provider. The audio call between the SLI and the called party is conducted through standard phone lines, such as the Public Switched Telephone Network (PSTN) or Voice-over-Internet-Protocol (VoIP), are not under the control of the correctional facility and do not have audio monitoring technology in place.

Figure 2:
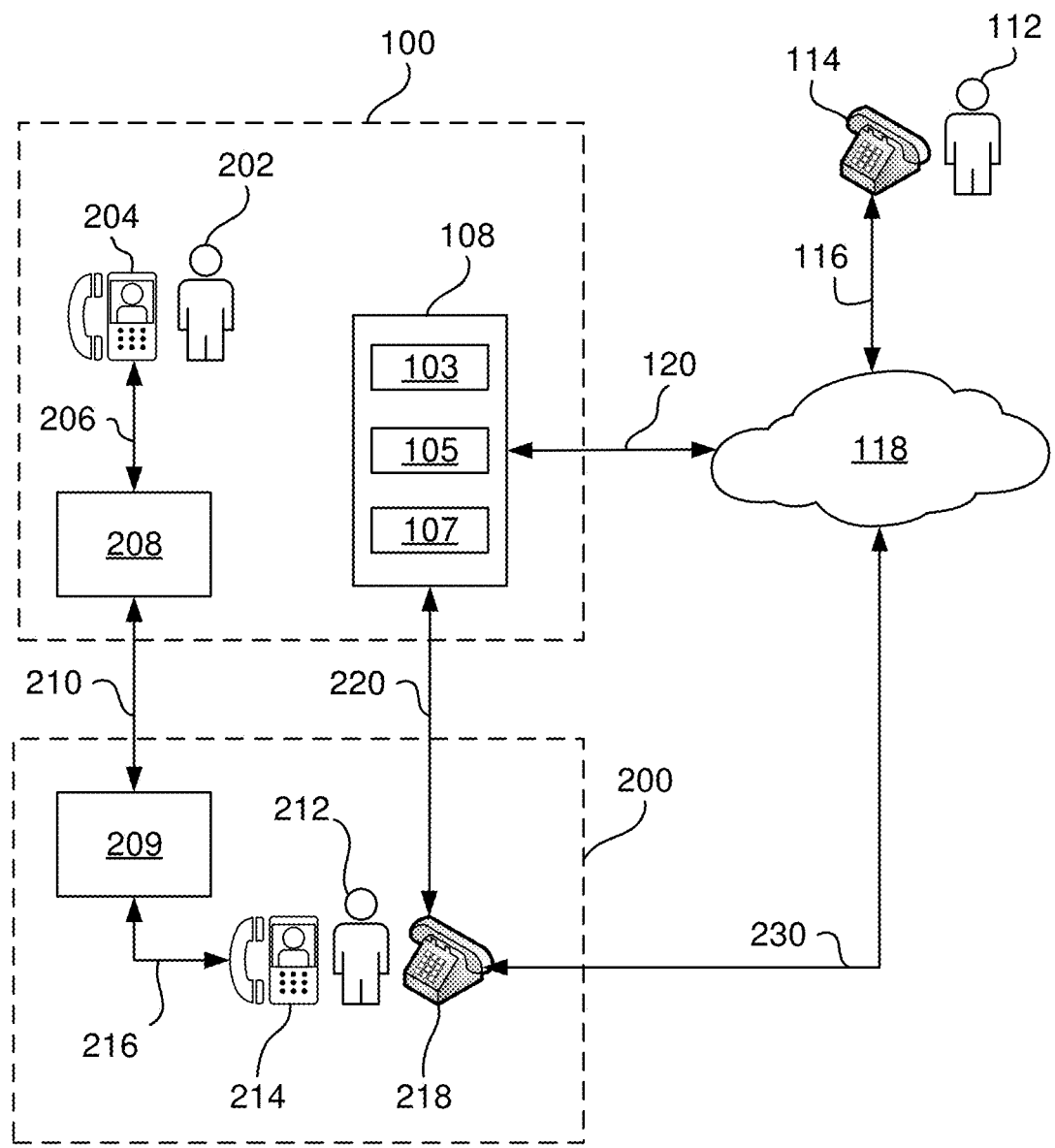
FIG. 2 is a diagram of a video relay service (VRS) system with audio monitoring service in accordance with embodiments of the present invention.

FIG. 2 is a diagram of a video relay service (VRS) system with audio monitoring service in accordance with embodiments of the present invention. User 202 is located at corrections facility 100. User 202 can be an inmate, a patient, an employee, a security officer, etc. User 202 is deaf, hard-of-hearing, or speech impaired (D-HOH-SI). User 202 places a video relay service (VRS) call to called party 112 using a VRS compatible device such as videophone 204. Videophone 204 is any device adapted to capture, send, and receive video signals of sufficient quality and frame rate to support sign language communication with a sign language interpreter. Videophone 204 can be realized as an integrated device that includes a camera, display, and means for transmitting and sending video signals. Videophone 204 can be a system of interconnected discrete components, such as a network-connected personal computer with a connected camera. Videophone 204 can be a mobile smartphone executing a VRS application or "app".

Videophone 204 is connected via connection 206 to VRS client 208. Alternatively, VRS client 208 can comprise software that executes on videophone 204. VRS client 208 can initiate the VRS call with VRS provider 200, or receive a call initiated by VRS provider 200. VRS client 208 sends VRS call parameters to VRS provider 200 that define operating conditions for the VRS call. For example, VRS call parameters can include PSTN routing information, an indication of whether the VRS call should be recorded, and an indication of whether user 202 is an inmate. VRS call parameters can be received via connection 210 by VRS provider exchange 209. Signaling over connection 210 can be implemented using session initiation protocol (SIP). Alternatively, signaling over connection 210 can be implemented using the H.323 standard from the International Telecommunication Union Telecommunication Standardization Sector (ITU-T). Those skilled in the art will recognize that any signaling means suitable for transmitting and receiving video substantially in real-time is within the scope of the present invention.

VRS provider exchange 209 sets up the VRS call at the VRS provider 200 using the received VRS call parameters. VRS provider exchange 209 routes the VRS call to videophone 214 used by sign language interpreter 212. VRS provider 200 can be a third-party company that provides VRS service for various customers using a staff of trained sign language interpreters.

Sign language interpreter 212 communicates in sign language, such as American Sign Language (ASL), with user 202 via the video relay service call and videophone 214. Sign language interpreter 212 also communicates in spoken language to called party 112 via telephone 218. Sign language interpreter 212 interprets the sign language in the video signal from user 202 and speaks the words to called party 112. Sign language interpreter 212 also listens to the words spoken by called party 112 and signs those words to user 202 in sign language.

How the spoken audio signals are routed to and from sign language interpreter 212 is determined by the VRS call parameters. If the VRS call parameters indicate that the audio portion of the VRS call should not be monitored (e.g., the call is from an employee or the call is from an inmate to a confidential called party), then the call can be routed directly public switched telephone network 118 via the VRS provider's connection 230 to PSTN 118 and the called party's connection 116 to the PSTN 118.

If the VRS call parameters indicate that the audio portion of the VRS call requires monitoring (e.g., the call is from an inmate and the call is not confidential), then the call can be routed back to audio monitoring service 108 via connection 220 for monitoring. Speech recognition component 103 can be used to detect keywords spoken during the audio portion of the VRS call by sign language interpreter 212 and called party 112 that may indicate potential criminal or other prohibited activity. Audio monitoring service 108 can also include recording component 105 for recording telephony signals originating from or received by corrections facility 100. The VRS call parameters can include an indication as to whether the call is to be recorded.

Audio monitoring service 108 can also include confidentiality component 107 for automatically determining whether telephony signals originating from or received by corrections facility 100 can be monitored or recorded. For example, telephone calls between an inmate and the inmate's attorney and clergy may be confidential. Monitoring of those calls by corrections facility 100 may be prohibited by law. The VRS call parameters can include an indication as to whether the call is confidential. The indication can be based on the phone number associated with the called party.

Some or all of audio monitoring service 108 can be installed at the corrections facility so that any outgoing and incoming telephony signals can be monitored or recorded. FIG. 2 shows audio monitoring service 108 as being located within corrections facility 200 for purposes of illustration. However, some or all of audio monitoring service 108 can be provided outside of the corrections facility by a third-party servicer that specializes in monitoring audio communications.

With any appropriate processing by audio monitoring service 108 enabled, the telephone call between sign language interpreter 212 and called party 112 is connected by connection 120 to public telephone network 118, such as the public switched telephone network (PSTN) and/or voice-over-internet-protocol (VOIP). The telephone call is connected to called party 112 by way of telephone 114 and connection 116 to PSTN 118. Pre-defined, forbidden, spoken keywords, potentially relating to, for example, planned criminal activities, may be detected by speech recognition component 103 of audio monitoring service 108, resulting in immediate actions such as termination of the call, or alerting of corrections personnel to begin real-time human monitoring of the offending call in anticipation of possible further undesirable discussions.

Figure 3:
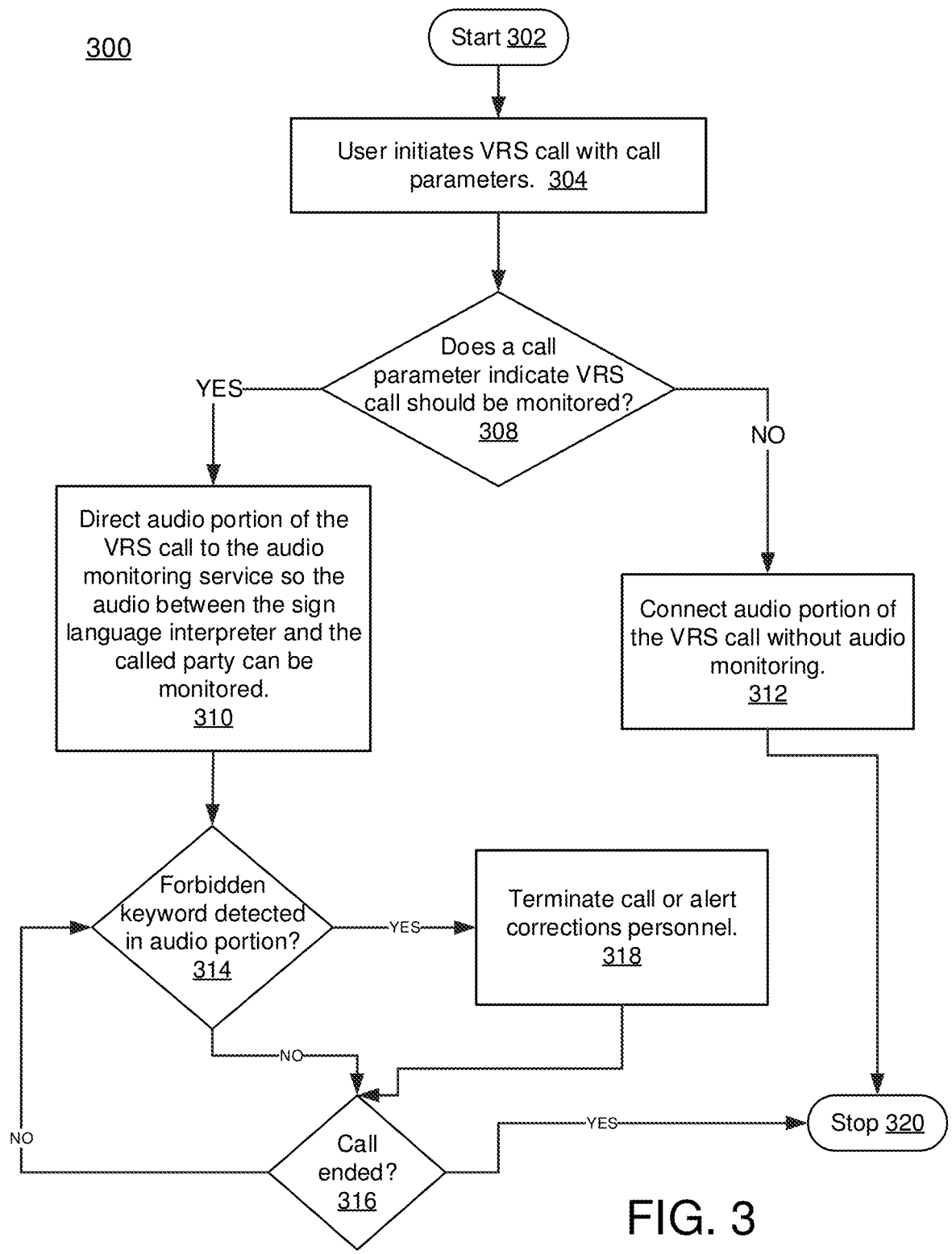
FIG. 3 is a flowchart showing a method of providing a video relay service with audio monitoring service in accordance with embodiments of the present invention.

FIG. 3 is a flowchart showing a method of video relay service calling with audio monitoring service in accordance with embodiments of the present invention. The method begins at 302. At step 304, a D-HOH-SI user initiates a VRS call. The user can be an inmate at a corrections facility. At step 308, the VRS provider determines whether a call parameter indicates that the call should be monitored. The call parameters can be determined by the VRS client at the corrections facility when the call is initiated, and then sent to the VRS provider as part of initiating the VRS call. If the call should not be monitored, at step 312 the audio portion of the VRS call is connected without audio monitoring, and then proceeds to 320. If the call should be monitored, at step 310 the audio portion of the VRS call is directed to the audio monitoring service so the audio between the sign language interpreter and the called party can be monitored. The call is monitored at step 314 to detect forbidding keyword spoken in the audio portion of the call. If a forbidden word if detected, at step 318 the call is terminated or personnel at the corrections facility is alerted. In response to the alert, the personnel at the corrections facility can commence real-time human monitoring of at least the audio portion of the VRS call. The method ends at 320.

While the foregoing describes a preferred embodiment of the present invention, one skilled in the art will appreciate that various changes, substitutions and alterations can be made without departing from the scope of the invention. For example, a single device having an integrated VRS client 105, 115 and display 106, 116 is within the scope of the present invention. Moreover, VRS client 105, 115 can be implemented as software executing on a general-purpose computer meeting the hardware requirements for video telephony over IP networks and programmed with software to perform the functions of VRS client 105, 115 and display 106, 116 as disclosed herein is within the scope of the present invention. Such general-purpose computers include desktop personal computers (PC), laptop computers, tablet computers, smartphones, etc. Portable devices such as smartphones and tablets having front-facing cameras and IP data connectivity can be particularly useful in helping D-HOH-SI persons communicate with hearing persons via VRS service due to the mobility of the portable devices.

While the foregoing describes a preferred embodiment of the present invention, one skilled in the art will appreciate that various changes, substitutions and alterations may be made without departing from the scope of the invention. For example, a single device having an integrated VRS client and display is within the scope of the present invention. Moreover, VRS clients implemented as software executing on general purpose computers meeting the hardware requirements for video telephony over IP networks and programmed with software to perform the functions of the VRS clients and displays as disclosed herein are within the scope of the disclosure. Such general-purpose computers may include desktop personal computers (PCs), laptop computers, tablet computers, smartphones, etc. Portable devices such as smartphones and tablets having front-facing cameras and IP data connectivity may be particularly useful in helping D-HOH-SI persons communicate with hearing persons via VRS service due to the mobility of the portable devices.

Although the present invention and its advantages have been described in detail, it should be understood that various changes, substitutions and alterations may be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for video relay service (VRS) calling comprising:
   connecting a video relay service call, the video relay service call including:
     a video portion between a sign language interpreter and a user who is deaf, hard-of-hearing, or speech impaired (D-HOH-SI);
     an audio portion between the sign language interpreter and a called party; and
     one or more VRS call parameters;
   determining whether at least one of the one or more call parameters indicates that the video relay service call should be monitored;
   in response to determining that at least one of the one or more call parameters indicates that the video relay service call should be monitored, directing the audio portion of the video relay service call between the sign language interpreter and the called party to an audio monitoring service so that the audio portion of the video relay service call between the sign language interpreter and the called party can be monitored by the audio monitoring service; and
   in response to determining that at least one of the one or more call parameters indicates that the video relay service call should not be monitored, connecting the audio portion of the video relay service call between the sign language interpreter and the called party without any audio monitoring.

2. The method of claim 1, in which the audio monitoring service includes detecting, by means of automated speech recognition, one or more predetermined keywords spoken during the audio portion of the video relay service call.

3. The method of claim 2, further comprising, in response to detecting, by means of automated speech recognition, one or more predetermined keywords spoken during the audio portion of the video relay service call, terminating the video relay service call.

4. The method of claim 1, in which the user who is deaf, hard-of-hearing, or speech impaired is an inmate incarcerated in a corrections facility.

5. The method of claim 4, in which the audio monitoring service is an audio monitoring service associated with the corrections facility.

6. The method of claim 5, further comprising, in response to detecting, by means of automated speech recognition, one or more predetermined keywords spoken during the audio portion of the video relay service call, alerting an employee of the corrections facility to begin real-time human monitoring of at least the audio portion of the video relay service call.

7. The method of claim 1, in which a provider of the audio monitoring service is a different entity than a provider of the video relay service.

8. A system for video relay service (VRS) calling comprising:
   a video relay service client;
   a video relay service provider;
   an audio monitoring service;
   connecting, by the video relay service client, a video relay service call, the video relay service call including:
     a video portion between a sign language interpreter and a user who is deaf, hard-of-hearing, or speech impaired (D-HOH-SI);
     an audio portion between the sign language interpreter and a called party; and
     one or more VRS call parameters;
   determining, by the video relay service provider, whether at least one of the one or more call parameters indicates that the video relay service call should be monitored;
   in response to determining that at least one of the one or more call parameters indicates that the video relay service call should be monitored, directing, by the video relay service provider, the audio portion of the video relay service call between the sign language interpreter and the called party to the audio monitoring service so that the audio portion of the video relay service call between the sign language interpreter and the called party can be monitored by the audio monitoring service; and
   in response to determining that at least one of the one or more call parameters indicates that the video relay service call should not be monitored, connecting, by the video relay service provider, the audio portion of the video relay service call between the sign language interpreter and the called party without any audio monitoring.

9. The system of claim 8, in which the audio monitoring service includes detecting, by means of automated speech recognition, one or more predetermined keywords spoken during the audio portion of the video relay service call.

10. The system of claim 9, further comprising, in response to detecting, by means of automated speech recognition, one or more predetermined keywords spoken during the audio portion of the video relay service call, terminating the video relay service call by the video relay service client.

11. The system of claim 8, in which the user who is deaf, hard-of-hearing, or speech impaired is an inmate incarcerated in a corrections facility.

12. The method of claim 11, in which the audio monitoring service is an audio monitoring service associated with the corrections facility.

13. The system of claim 12, further comprising, in response to detecting, by means of automated speech recognition, one or more predetermined keywords spoken during the audio portion of the video relay service call, alerting, by the audio monitoring service or the video relay service client, an employee of the corrections facility to begin real-time human monitoring of at least the audio portion of the video relay service call.

14. The system of claim 8, in which a provider of the audio monitoring service is a different entity than a provider of the video relay service.

15. The method of claim 1, in which the one or more VRS call parameters includes an indication as to whether the call is confidential.

16. The method of claim 15, in which the indication as to whether the call is confidential is based on a phone number associated with the called party.

17. The system of claim 8, in which the one or more VRS call parameters includes an indication as to whether the call is confidential.

18. The system of claim 17, in which the indication as to whether the call is confidential is based on a phone number associated with the called party.

* * * * *